United States Patent
Howell et al.

(10) Patent No.: US 12,434,859 B2
(45) Date of Patent: Oct. 7, 2025

(54) AIRCRAFT CONTROL SYSTEM

(71) Applicants: AIRBUS OPERATIONS LIMITED, Bristol (GB); AIRBUS OPERATIONS (S.A.S.), Toulouse (FR)

(72) Inventors: George Howell, Bristol (GB); Louis Emmanuel Romana, Toulouse (FR)

(73) Assignees: AIRBUS OPERATIONS LIMITED, Bristol (GB); AIRBUS OPERATIONS (S.A.S.), Toulouse (FR)

( * ) Notice: Subject to any disclaimer, the term of this patent is extended or adjusted under 35 U.S.C. 154(b) by 323 days.

(21) Appl. No.: 17/669,011

(22) Filed: Feb. 10, 2022

(65) Prior Publication Data

US 2022/0250769 A1    Aug. 11, 2022

(30) Foreign Application Priority Data

Feb. 11, 2021    (GB) ...................................... 2101929

(51) Int. Cl.
*B64F 5/60*    (2017.01)
*B64D 43/00*    (2006.01)
(Continued)

(52) U.S. Cl.
CPC ................ *B64F 5/60* (2017.01); *B64D 43/00* (2013.01); *B64D 45/04* (2013.01); *G06N 20/00* (2019.01)

(58) Field of Classification Search
CPC .......... B64F 5/60; B64D 43/00; B64D 45/04; G05D 1/0088; G05D 1/0077;
(Continued)

(56) References Cited

U.S. PATENT DOCUMENTS 5,901,272 A  *  5/1999  Schaefer, Jr.  .............  G01P 5/00
                                                                 701/7
10,032,111 B1 *  7/2018  Bertram  ....................  G09B 9/16
                          (Continued)

FOREIGN PATENT DOCUMENTS

EP    2 910 440    8/2015
EP    3 415 416    12/2018
(Continued)

OTHER PUBLICATIONS

Ma et al. DeepCT: Tomographic Combinatorial Testing for Deep Learning Systems. IEE Explore. (Year: 2019).*
(Continued)

*Primary Examiner* — Hunter B Lonsberry
*Assistant Examiner* — Henry R Hinton
(74) *Attorney, Agent, or Firm* — Nixon & Vanderhye P.C.

(57) ABSTRACT

An aircraft control system (100) including an aircraft control module (110) and a test module (120). The aircraft control module includes a memory storing a machine learning model (130) adapted, based on received live aircraft operating inputs (102*a*-102*f*), to generate live aircraft control outputs (104*a*-104*b*). The test module (120) includes a memory storing input data representing test aircraft operating inputs (102*a'*-102*f'*) and respective output data representing expected aircraft control outputs (114*a*, 114*b*) that are expected to be generated by the aircraft control module in response to an input of the respective test aircraft operating inputs (102*a'*-102*f'*). The test module (120) is adapted to write test aircraft operating inputs (102*a'*-102*f'*) to the aircraft control module, read test aircraft control outputs (104*a'*-104*b'*) of the aircraft control module (110), and remove the authority of the aircraft control module (110) to perform aircraft control.

26 Claims, 5 Drawing Sheets

(51) Int. Cl.
  *B64D 45/04* (2006.01)
  *G06N 20/00* (2019.01)
(58) Field of Classification Search
  CPC .. G05D 1/0055; G06N 20/00; G06F 11/3668; G05B 19/048; G05B 23/00
  See application file for complete search history.

(56) References Cited

U.S. PATENT DOCUMENTS

| | | | |
|---|---|---|---|
| 10,635,520 B2 | 4/2020 | Li et al. | |
| 11,360,476 B1* | 6/2022 | Greve | B64D 43/00 |
| 2007/0182590 A1* | 8/2007 | Younkin | G01C 23/00 340/973 |
| 2016/0257429 A1* | 9/2016 | Szeto | B64F 5/60 |
| 2018/0157548 A1* | 6/2018 | Li | G06F 11/3055 |
| 2018/0285772 A1* | 10/2018 | Gopalan | G06N 7/01 |
| 2020/0309810 A1* | 10/2020 | Carvalho | G01C 23/00 |
| 2022/0033066 A1* | 2/2022 | Rey | B64C 13/503 |
| 2022/0177154 A1* | 6/2022 | Stepp | B64F 5/60 |
| 2022/0206978 A1* | 6/2022 | Kim | G06F 11/20 |

FOREIGN PATENT DOCUMENTS

| | | |
|---|---|---|
| EP | 3 550 391 A1 | 10/2019 |
| EP | 3 663 211 | 6/2020 |

OTHER PUBLICATIONS

Communication Pursuant to Article 94(3) EPC cited in EP 22 155 690.5, dated Oct. 5, 2023, 7 pages.

Combined Search and Examination Report for GB Application No. 2101929.4 dated Oct. 6, 2021, 8 pages.

* cited by examiner

AIRCRAFT CONTROL SYSTEM

RELATED APPLICATION

This application incorporates by reference and claims priority to United Kingdom patent application GB 2101929-4 filed Feb. 11, 2021.

TECHNICAL FIELD

The present invention relates to aircraft control systems. In particular, but not exclusively, the present invention relates to aircraft control systems comprising machine learning models.

BACKGROUND

Aircraft typically comprise control systems, which are developed by devising rules to govern the operation of the aircraft control system in a range of scenarios and coding these rules into the aircraft control system. Developing these control systems generally involves a considerable amount of time and planning. While techniques involving artificial intelligence may be employed and may decrease the time taken to develop such systems, sufficient trust has to be afforded to such techniques before they are considered to be safe.

SUMMARY

A first aspect of the present invention provides an aircraft control system comprising: an aircraft control module comprising a memory storing a machine learning model adapted, based on received live aircraft operating inputs, to generate live aircraft control outputs, to perform aircraft control; and a test module comprising a memory storing input data representing test aircraft operating inputs and respective output data representing expected aircraft control outputs that are expected to be generated by the aircraft control module in response to an input of the respective test aircraft operating inputs, wherein, the test module is adapted, while the aircraft control module is not performing aircraft control, to: write test aircraft operating inputs to the aircraft control module; read test aircraft control outputs of the aircraft control module generated based on the respective test aircraft operating inputs; and selectively remove the authority of the aircraft control module to perform aircraft control if the test aircraft control outputs do not conform to the respective expected aircraft control outputs.

Optionally, the authority of the aircraft control module is selectively removed by powering off the aircraft control module.

Powering off the aircraft control module may provide an effective way to selectively remove the authority of the aircraft control module and ensure that no erroneous aircraft control is transmitted to the aircraft.

Optionally, the aircraft control module is part of any of: an avionics system, a flight control system, a braking control system, an instrumentation and recording system, a landing gear control system and a fuel system.

This may provide an effective way to ensure that no erroneous control data is transmitted to other systems of the aircraft.

Optionally, the aircraft control system comprises a backup system to replace the aircraft control module when the authority of the aircraft control module is selectively removed.

In this way, non-erroneous aircraft controls can be sent to the aircraft to control other systems of the aircraft, for example, while ensuring the control of these systems. The backup system may be used to replace the aircraft control module for the rest of the duration the flight/journey when the authority of the aircraft control module has been removed.

Optionally, the backup system is a manual system operable to perform aircraft control or a backup aircraft control module storing a second machine learning model adapted to generate live aircraft control outputs to perform aircraft control.

In this way, the pilots of the aircraft may operate the manual system (for example, the brakes of the plane) for the rest of the duration of a current flight or an alternative control module storing a second neural network which may be the same as the first neural network may be used to generate the aircraft controls. Alternatively, the manual system may be a manually-defined, rules-based set of logic for aircraft control.

Alternatively, any second neural network may be different from the first neural network. The second neural network may also be tested to ensure that it is not corrupted and that the aircraft controls are reliable.

Optionally, the test module writes test aircraft operating inputs to the aircraft control module while the aircraft control module is not performing aircraft control for a predefined duration.

This way, systems such as, for example, a flight control system or a navigation system which are operating intermittently during flights may be tested while operating.

Optionally, the test aircraft operating inputs comprise multiple different sets of test aircraft operating inputs, and the test module is adapted to write each set of test aircraft operating inputs to the aircraft control module, read test aircraft control outputs of the aircraft control module generated based on each set of the respective test aircraft operating inputs, and selectively remove the authority of the aircraft control module to perform aircraft control if at least one of the test aircraft control outputs do not conform to the respective expected aircraft control outputs for the respective test aircraft operating input set.

Optionally, the multiple sets of test aircraft operating inputs are arranged to use each weight, bias and activation function of the machine learning model.

This way, every part of the machine learning model may be tested and corruption to any bit in any part of the machine learning model may be identified.

A second aspect of the present invention provides a method for controlling an aircraft, the method comprising receiving live aircraft operating inputs and generating live aircraft control outputs, based on the received live aircraft operating inputs, at an aircraft control module comprising a memory storing a machine learning model; writing test aircraft operating inputs to the aircraft control module while the aircraft control module is not performing aircraft control; reading test aircraft control outputs of the aircraft control module generated based on the respective test aircraft operating inputs; and selectively removing the authority of the aircraft control module to perform aircraft control if the test aircraft control outputs do not conform to the respective expected aircraft control outputs.

Optionally, selectively removing the authority of the aircraft control module comprises powering off the aircraft control module.

Powering off the aircraft control module may provide an effective way to selectively remove the authority of the aircraft control module and ensure that no erroneous aircraft control is transmitted to other systems of the aircraft.

Optionally, the aircraft control module is part of: an avionics system, a flight control system, a braking control system, an instrumentation and recording system, a landing gear control system and a fuel system.

This may provide an effective way to ensure that no erroneous control data is transmitted to other systems of the aircraft.

Optionally, the method comprises replacing the aircraft control module with a backup system when the authority of the aircraft control module is selectively removed.

In this way, non-erroneous aircraft controls can be sent to the aircraft to control systems of the aircraft, for example, while ensuring the control of these systems. The backup system may be used to replace the aircraft control module for the rest of the duration the flight/journey when the authority of the aircraft control module has been removed.

Optionally, the backup system is a manual system or a backup aircraft control module storing a backup aircraft control module storing a second machine learning model adapted to generate live aircraft control outputs to perform aircraft control.

In this way, the pilots of the aircraft may operate the manual system (for example, the brakes of the plane) for the remainder of a current flight or an alternative control module storing a second neural network which may be the same as the first neural network may be use to generate the aircraft controls. Alternatively, the manual system may be a manually-defined, rules-based set of logic for aircraft control.

Alternatively, any second network may be different from the first network. The second neural network may also be tested to ensure that it is not corrupted and that the aircraft controls are reliable.

Optionally, the writing test aircraft operating inputs to the aircraft control module occurs while the aircraft control module is not performing aircraft control for a predefined duration.

In this way, systems such as, for example, a flight control system or a navigation system which are operating intermittently during flights may be tested while operating.

Optionally, the test aircraft operating inputs comprise multiple different sets of test aircraft operating inputs, and the method comprises writing each set of test aircraft operating inputs to the aircraft control module, reading test aircraft control outputs of the aircraft control module generated based on each set of the respective test aircraft operating inputs, and selectively removing the authority of the aircraft control module to perform aircraft control if at least one of the test aircraft control outputs do not conform to the respective expected aircraft control outputs for the respective test aircraft operating input set.

Optionally, the multiple sets of test aircraft operating inputs are arranged to use each weight, bias and activation function of the machine learning model.

This way, every part of the machine learning model may be tested and corruption to any bit in any part of the machine learning model may be identified.

A third aspect of the present invention provides an aircraft comprising the aircraft control system described above for controlling an aircraft.

BRIEF DESCRIPTION OF THE DRAWINGS

Embodiments of the invention will now be described, by way of example only, with reference to the accompanying drawings, in which.

DETAILED DESCRIPTION

Figure 1:
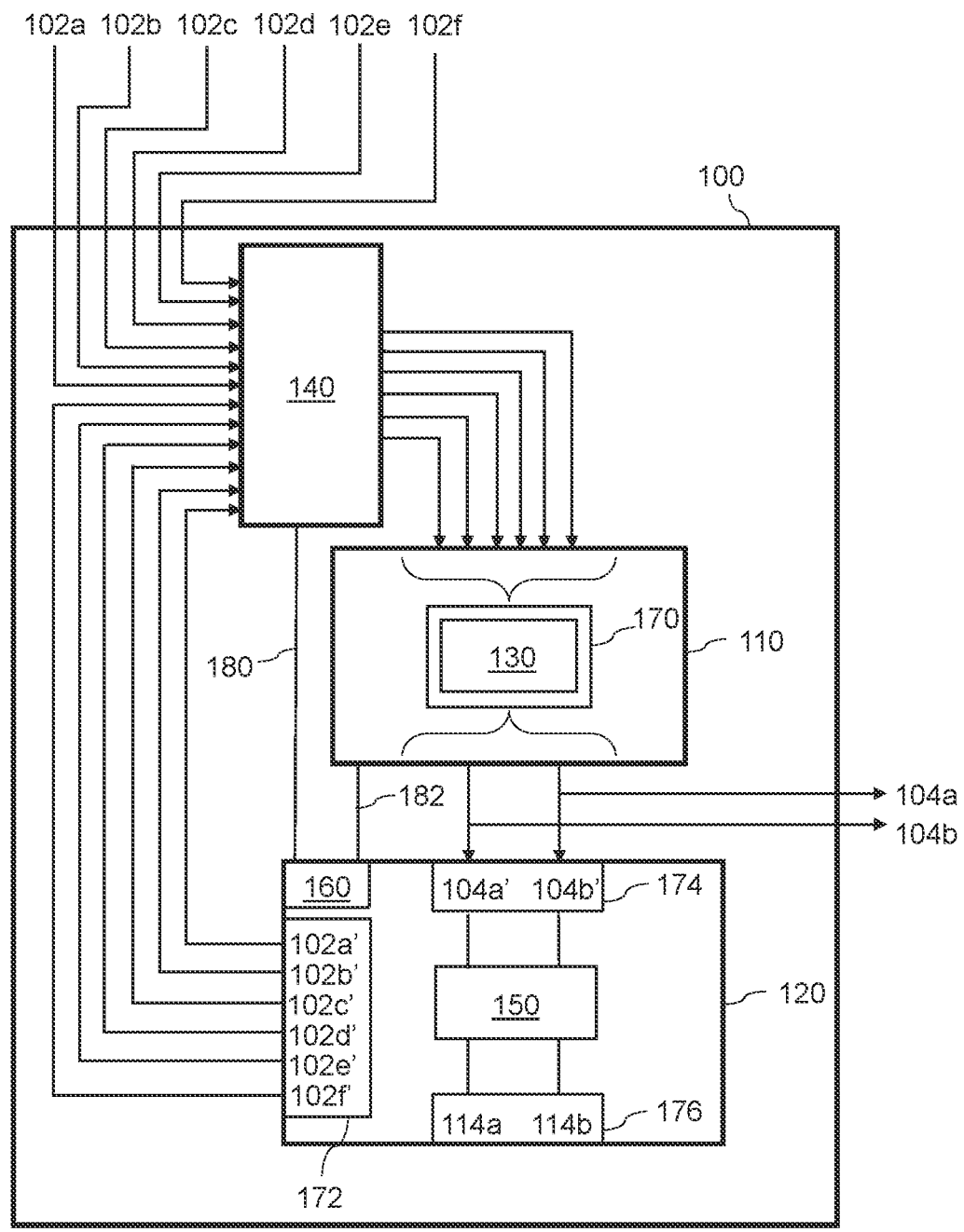
FIG. 1 is a schematic diagram of an aircraft control system according to an example.

Aircraft systems are becoming increasingly complex. As aircraft systems have grown in complexity, automation has been used, for example 'fly-by-wire', to alleviate an increasing burden on pilots of these aircraft. However, developing systems to provide the automation is commensurately complex.

Designers of aircraft control systems, which are used to provide the automation, are considering the inclusion of machine learning models such as neural networks in aircraft control systems. The use of artificial intelligence in aircraft control systems may be beneficial, for example, to operate an aircraft efficiently even in scenarios that may not have been foreseen in design specifications. Further, aircraft control systems employing artificial intelligence may not be bound by the experience of designers of these systems and so may be capable of identifying and operating the aircraft in more efficient ways than other aircraft control systems which are designed to a fixed specification. This is particularly the case when a new aircraft is being designed, since design parameters associated with existing fleets of aircraft may not apply to a new aircraft design.

Machine learning models in the present context may be considered to be the output of a machine learning training process that typically employs a machine learning algorithm that learns from a training dataset. A machine learning model typically comprises both data and procedures that employ the data to process inputs and produce outputs. One kind of machine learning model, which is used in the illustrations herein, is an artificial neural network or simply 'neural network'. A neural network comprises data in the form of weights and biases and procedures in the form of activation functions. Although the illustrations herein focus on neural networks, the principles apply equally to other machine learning models (such as Random Forest and Support Vector Machines) that can be impacted in aircraft systems in the manner that will now be described.

Neural networks that may be deployed in the aviation industry may be large, complex and multi-layered and may control systems. Such neural networks may comprise a vast array of constants defining weights and biases of neurons and their connections. It has been appreciated that one potential issue that may be encountered when using systems comprising neural networks at high altitude is the corruption of the neural network due to electromagnetic radiation, such as gamma radiation. In particular, it has been appreciated that gamma radiation may cause single event upsets or multi-event upsets in data, stored in random access memory (RAM), which defines the neural network or, indeed, any other kind of machine learning model). Even small changes in data, for example even a change in one bit of data, would have the potential to modify weights and biases in a neural network and change the behaviour thereof. In this way, a neural network that was well-designed and robust, and previously capable of safely controlling an aircraft, may become unreliable.

Certain examples described herein relate to an aircraft control system comprising an aircraft control module of known kind comprising a neural network, wherein the aircraft control system controls the aircraft based on outputs from the aircraft control module. A test module may be used to determine whether the neural network is corrupted by comparing test aircraft control outputs generated by the neural network of the aircraft module with respective excepted aircraft control outputs. Beneficially, in case of corruption, for example, if the aircraft control outputs do not conform to the respective excepted aircraft control outputs, the test module may selectively remove the authority of the aircraft control module in case of corruption. A backup system, such as a manual system or another neural network may be used to replace the aircraft control module for the rest of the duration of the current flight.

FIG. 1 shows an aircraft control system 100 comprising an aircraft control module 110 and a test module 120. The aircraft control system 100 may be implemented in any appropriate combination of hardware and software components including, for example, at least one processor, at least one memory, and one or more interfaces for interfacing with equipment in the aircraft. The at least one memory includes any suitable combination of transitory and non-transitory storage and stores computer-readable instructions for implementing the aircraft control module 110 and the test module 120.

The aircraft control module 110 of the aircraft control system 100 is adapted to receive live aircraft operating inputs, 102a-102f, and to generate live aircraft control outputs, 104a-104b, which are used to control an aircraft.

The test module 120 is adapted to write test aircraft operating inputs, 102a'-102f', to the aircraft control module 110 and read test aircraft control outputs, 104a'-104b', of the aircraft control module 110 generated based on the respective test aircraft operating inputs. The test module 120 uses these test aircraft control outputs, 104a'-104b', to determine whether they conform to respective expected aircraft control outputs, 114a-114b. It will be appreciated that while in this example the neural network has six inputs and two outputs, in other examples there can be any appropriate number of inputs and outputs.

It will be appreciated that a neural network according to examples herein may, in practice, be subjected to a vast array of different arrangements or combinations of live aircraft operating inputs, 102a-102f. Any individual set of live aircraft operating inputs, 102a-102f, may produce respective aircraft control outputs by using only a portion of the neural network. Put another way, only a subset of the weights, biases and activation functions of a neural network may be brought to bear (i.e. used) to process any one individual set of aircraft operating inputs. Consequently, it will be appreciated that multiple sets of test aircraft operating inputs, 102a'-102f', may be selected and adapted to ensure that every weight, bias and activation function of a respective neural network dominates, or is 'used', at least once in performing a test operation comprising use of the multiple sets of test aircraft operating inputs. In the present example, for instance, each set of test aircraft operating inputs 102a'-102f' may comprise a different arrangement of six inputs. In particular, each input may be defined to result in a known output (the expected aircraft control outputs, 114a-114b) and thereby each bias and each weight of the neural network 130 may be tested. Alternatively, the test aircraft operating inputs, 102a'-102f', may include values of hidden neurons of the neural network 130 and the test module 120 may, during testing, override values of the hidden neurons in order to test one layer of the neural network 130 at a time. In this way, it can be assured that corruption to any bit in any part of the neural network can be identified by at least one set of test aircraft operating inputs. When testing neural networks which maintain state, i.e. include state memory, as in those which process sequences of inputs rather than individual inputs, it will be appreciated that each individual test may involve multiple sets of test aircraft operating inputs. In such examples, multiple tests, each comprising multiple sets of test aircraft operating inputs, may be required to assure that every weight, bias and activation function of a respective neural network dominates, or is 'used', at least once in performing a test operation.

The aircraft control module 110 comprises a memory 170 storing a neural network 130. At least a portion of the memory 170 includes volatile memory that may suffer from data corruption, for example due to gamma radiation as explained hereinbefore, and so may include random-access memory (RAM), synchronous dynamic random-access memory (SDRAM), or any other type of memory where respective bit values may be corrupted. In particular, the weights and biases of the neural network 130 may suffer from data corruption. The neural network 130 may be, for example, any known type of neural network that can be trained and deployed as an element in an aircraft control system. For example, the neural network 130 may be a fully connected neural network 130, a convolutional neural network, or a recurrent neural network. The neural network 130 in the aircraft control module 110 has been trained in a known way, for example by reference to training data relating to the operation and behaviour of a known aircraft system. Training may be performed using a large data set comprising historic data from known aircraft systems, or by being installed on an aircraft in a purely passive role, for period of time, to record and train using live data.

The test module 120 comprises a memory 172 storing input data representing test aircraft operating inputs, 102a'-102f', and a memory 176 storing respective output data representing expected aircraft control outputs, 114a-114b. The memories 172, 176 may comprise any suitable combination of volatile and non-volatile memories. The test module 120 also comprises a monitor 160, to monitor an operating status of the control module 110 via a sense line 182, and select, via a control line 180, which inputs to send to the aircraft control module 110. The test module also comprises a memory 174 storing test aircraft control outputs, 104a'-104b' from the aircraft control module 110. The test module 120 also comprises a comparison module 150 for comparing the test aircraft control outputs, 104a'-104b' and respective output data representing expected aircraft control outputs, 114a-114b.

According to the present example, the aircraft control system 100 comprises a selector 140 for selecting inputs to be sent to the aircraft control module 110. The selector 140, which may comprise a multiplexor or a switch device, may select live aircraft operating inputs, 102a-102f, or test aircraft operating inputs, 102a'-102f', to be sent to the aircraft control module 110. In other examples, the aircraft control system 100 may also comprise a second selector module (not shown in FIG. 1) for selecting the outputs to be sent to the aircraft or to the test module 120. For example, such a second selector module may select live aircraft control outputs, 104a-104b, to be sent to the aircraft (to perform aircraft control), or test aircraft control outputs, 104a'-104b', to be sent to the test module 120, based on a status of the control module 110 determined by the monitor 160.

Certain examples described herein provide a method for controlling an aircraft using an aircraft control module 110 comprising a neural network 130 and a test module 120 for removing the authority of the aircraft control module 110 if test the aircraft control outputs 104a'-10b' generated by the aircraft control module 110 do not conform to respective expected aircraft control outputs 114a-114b stored in the test module 120.

Figure 2:
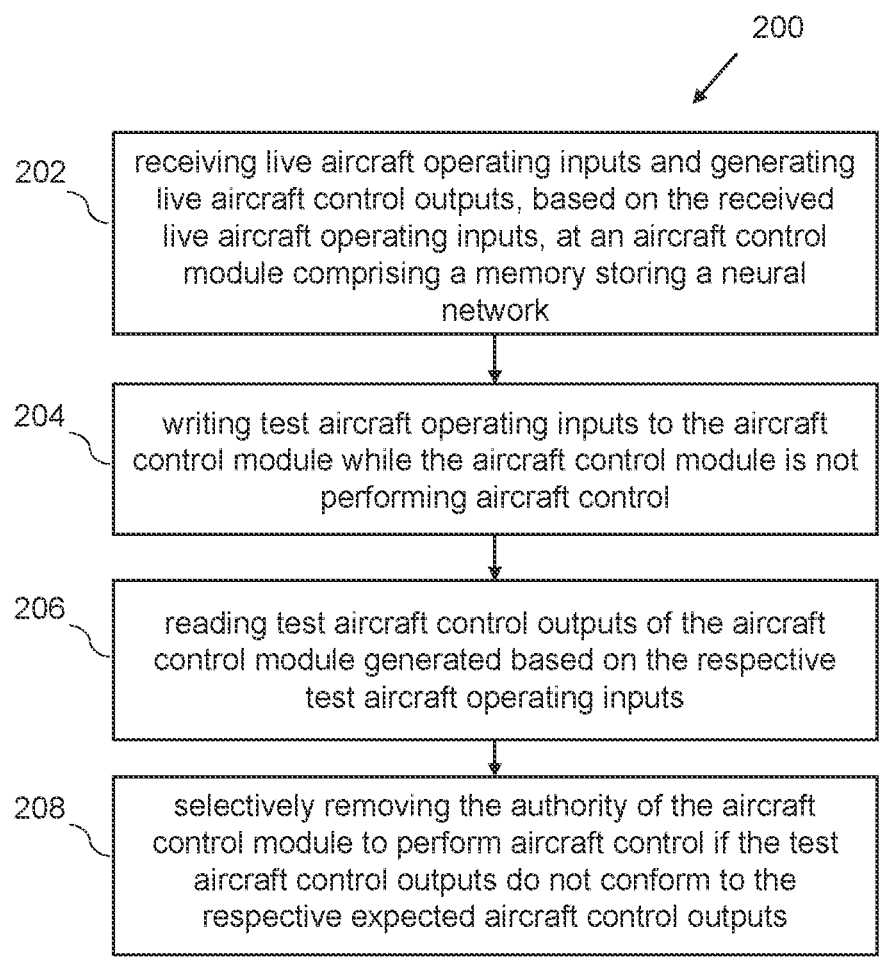
FIG. 2 is a flow diagram of a method of controlling an aircraft according to an example.

FIG. 2 shows a method 200 which is implemented by the aircraft control system 100, in the form of a flow chart, 202 to 208. The method 200 comprises, at a first block 202, receiving live aircraft operating inputs, 102a-102f, and generating live aircraft control outputs, 104a-104b, based on the received live aircraft operating inputs, 102a-102f, at an aircraft control module 110 comprising a memory 170 storing a neural network 130.

The live aircraft operating inputs, 102a-102f, represent an operating state of the aircraft and include, for example, signals from sensors and signals resulting from user operations and inputs. Signals from user inputs include control signals generated at interfaces such as switches, levers, buttons, inputs from touch screens, and the like. These input control signals are received from any suitable interfaces in the aircraft, for example, flight controls, cabin environment controls, communication controls, and others. The specific nature and origin of the user inputs depends on the systems in the aircraft which the aircraft control system 100 is adapted to control. Signals from sensor outputs include signals from any suitable sensors in the aircraft. These sensors can include environmental sensors, which monitor the environmental conditions of the aircraft, and equipment sensors, which monitor the operational states of equipment in the aircraft. For example, the live aircraft operating inputs, 102a-102f, may indicate live operational states of one or more hydraulic systems which are configured to operate the brakes, as well as the status of one or more alternative (e.g. electrical) motors and respective power sources for operating the brakes in the event of hydraulic failure. The live aircraft operating inputs, 102a-102f, may also comprise other relevant information, for example, a live operational state of the engines of the aircraft, an indication of whether there is weight-on-wheels, and indications of environmental conditions such as wind speed and direction, and outside temperature and humidity, derived from one or more aircraft sensors. The live aircraft operating inputs 102a to 102f may represent states of equipment comprised in other aircraft systems. The live aircraft operating inputs, 102a-102f, may be received or sampled in a time period or may be time-varying, and may be analogue or digital in nature. Analogue signals are converted, for example via an appropriate analogue-to-digital convertor (not shown), before being input to the aircraft control module 110.

The live aircraft control outputs, 104a-104b, generated by the aircraft control module 110 are used to perform aircraft control. The aircraft control module 110 is part of an aircraft system. For example, the aircraft control module 110 may be part of any of: an avionics system, a flight control system, a braking control system or other partly or fully hydraulic control system, an instrumentation and recording system, a landing gear control system and a fuel system. For example, where the aircraft control module 110 is part of a braking control system, the aircraft control module 110 may be adapted to receive live aircraft operating inputs, 102a-102f, relating to wheel speed, aircraft speed, and an amount of braking specified at a brake pedal by the pilot. The aircraft control module 110 may process these inputs and determine an amount of braking to be applied. The aircraft control module 110 may then operate the brakes in a manner dictated by outputs of the aircraft control module 110 according to the received live aircraft operating inputs, 102a-102f. As with the inputs, the live aircraft control outputs, 104a-104b, may be conditioned or converted in any way that is necessary for a required downstream control.

The method 200 then comprises, at a second block 204, writing test aircraft operating inputs, 102a'-102f', to the aircraft control module 110 while the aircraft control module 110 is not performing aircraft control, for example, as determined by the monitor 160. The test aircraft operating inputs, 102a'-102f', represent an operating state of the aircraft that may otherwise have been received as live aircraft operating inputs, 102a-102f. For example, test aircraft operating inputs, 102a'-102f', may reflecting a possible operational state of at least one operating component of the aircraft. For example, a possible operational state of the at least one component of the aircraft may comprise a possible control input. The possible control input may be due to aircrew such as a pilot operating or actuating a device, apparatus or system. The possible control input may include a value of a control input, for example, a value representing the position of a throttle, a braking actuator, and/or other control inputs. Alternatively or additionally, the possible control input may comprise a rate of change rather than a value. In some examples, the possible control input may be a multivariate quantity indicating both an instantaneous value (e.g. a position) and a rate and/or direction of change. The possible control input may be represented by a plurality of values or a plurality of multivariate quantities expressing an operation of a device, apparatus or system over a defined period. In another example, the at least one component associated with the aircraft control system 100 may be the brakes of an aircraft, and the test aircraft operating inputs, 102a'-102f', may indicate whether there is weight-on-wheels, environmental conditions such as wind speed and direction, and outside temperature and humidity.

The expected aircraft control outputs, 114a-114b, are generated by inputting the test aircraft operating inputs, 102a'-102f', into a neural network when operating under controlled or test conditions, which are designed to mirror a real operation of the aircraft and aircraft control module 110. Before and after the generation of the expected aircraft control outputs, 114a-114b, the values of the constants of the neural network are checked to establish that no unexpected changes have occurred and thereby confirm that the expected aircraft control outputs, 114a-114b, are correct. Once confirmed, the expected aircraft control outputs, 114a-114b, are stored in the test module 120. The expected aircraft control outputs 114a, 114b may be generated by a neural network being the same as the neural network 130 of the aircraft control module 110. For example, if a component to be controlled comprises the brakes of an aircraft, the test aircraft operating inputs, 102a'-102f', may indicate whether there is weight-on-wheels, environmental conditions such as wind speed and direction, and outside temperature and humidity. The excepted aircraft control outputs, 114a-114b, may then represent the control of the brakes based on the weight-on-wheels, environmental conditions, and outside temperature and humidity inputs.

The test module 120 is adapted to write the test aircraft operating inputs, 102a'-102f', to the aircraft control module 110 while the aircraft control module 110 is not performing aircraft control, so that the operation of the aircraft control module is not disturbed. For example, if the aircraft control module 110 is adapted to perform aircraft control of the brakes, the test module 120 may write the test aircraft operating inputs, 102a'-102f', to the aircraft control module 110 at any time of the flight other than while landing.

In the test module 120, the monitor 160 determines whether the aircraft control module 110 is performing aircraft control and controls the selector 140 to communicate to the aircraft control module 110 either:

live aircraft operating inputs, 102a-102f, when the aircraft control module 110 is performing aircraft control, or test aircraft operating inputs, 102a'-102f', when the aircraft control module 110 is not performing aircraft control.

For example, consider a scenario in which the aircraft control system 100 is adapted to control the brakes of an aircraft. The monitor 160 of the test module 120 is adapted to determine whether the aircraft control module 110 is performing brake control. This may be determined in this example by checking the status of the aircraft control system 110. If the monitor 160 determines that the control module 110 is not performing brake control, the test module 120 writes test aircraft operation inputs, 102a'-102f', related to brake operations (for example, information related to whether there is weight-on-wheels, environmental conditions such as wind speed and direction, and outside temperature and humidity) to the selector 140 and controls the selector 140 to select and transmit the test aircraft operating inputs, 102a'-102f', to the aircraft control module 110. At all other times, for instance when the aircraft control module 110 is performing aircraft (e.g. brake) control, the selector 140 is arranged to transmit live aircraft operating inputs, 102a-102f, to the aircraft control module 110.

In another example, the test module 120 may write test aircraft operating inputs, 102a'-102f', to the aircraft control module 110 while the aircraft control module 110 is not performing aircraft control and based on certain criteria. For example, in respect of an aircraft braking system, the test module 120 may be responsive to the passing of a predetermined period of time after take-off (i.e. when it is known that braking is not required). In another example, in which the aircraft control system 100 may be adapted to control a navigation system of an aircraft. The navigation system may be operating intermittently during flight and, therefore, the monitor 160 of the test module 120 may be adapted to determine whether the aircraft control module 110 is not performing navigation control for at least a predefined duration of time. The predefined duration of time may be, for example, 1 ms, 10 ms, or 1 s.

The method 200 also comprises, at a third block 206, reading test aircraft control outputs, 104a'-104b', of the aircraft control module 110 generated based on the respective test aircraft operating inputs, 102a'-102f'.

The aircraft control module 110 generates test aircraft control outputs, 104a'-104b', based on the received test aircraft operating inputs, 102a'-102f'. For example, according the previous example, if the test aircraft operation inputs, 102a'-102f', represent information related to whether there is weight-on-wheels, environmental conditions such as wind speed and direction, and outside temperature and humidity, the aircraft control module 110 generates test aircraft control outputs, 104a'-104b', that relate to the operation of the brakes of the aircraft based on the received information related to whether there is weight-on-wheels, environmental conditions such as wind speed and direction, and outside temperature and humidity.

The aircraft control module 110 outputs the test aircraft control outputs, 104'-104b' and the test module 120 is adapted to read the test aircraft control outputs, 104'-104b', generated by the aircraft module 110. The test module 120 comprises a comparison module 150 adapted to perform a comparison function between the test aircraft control outputs, 104'-104b', and the respective expected aircraft control outputs, 114a-114b.

The method also comprises at a fourth block 208, selectively removing the authority of the aircraft control module to perform aircraft control if the test aircraft control outputs do not conform to the respective expected aircraft control outputs. If the comparison module 150 determines that the test aircraft control outputs, 104'-104b', conform to the respective excepted aircraft control outputs, 114a-114b, no action is taken. However, if the comparison module 150 determines that the test aircraft control outputs, 104'-104b', do not conform to the respective excepted aircraft control outputs, 114a-114b, the test module 120 is adapted to selectively remove the authority of the control module 110. For example, the test module 120 may selectively remove the authority of the control module 110 for at least the duration of a current journey/flight. That way, the aircraft control module is prevented from performing potentially erroneous aircraft control due to, for example, a corruption of the neural network. The test module 120 may selectively remove the authority of the aircraft control module 110, for example, by powering-off, or in some other way, disabling the aircraft control module 110. Additionally, a pilot of the aircraft may be notified that the aircraft control module 110 has been de-authorised and/or disabled.

In another embodiment, the aircraft control system 100 may comprise a backup system to replace the aircraft control module 110 when the authority of the aircraft control module 110 is selectively removed. The backup system may be a manual system operable to perform aircraft control. For example, the aircraft control module 110 may be part of the braking control system. If the test module 120 determines that the test aircraft control outputs, 104a'-104b', do not conform to the respective expected aircraft control outputs, 114a-114b, the test module 120 selectively removes the authority of the aircraft control module 110. The pilots of the aircraft may operate the brakes for the rest of the duration of a current flight. Alternatively, the manual system may be a manually-defined, rules-based set of logic for aircraft control. Alternatively, the backup system may be a backup aircraft control module comprising a second neural network adapted to generate live aircraft control outputs to perform aircraft control. The second neural network may be the same as the neural network 130 of the aircraft control module 110 which may be used for the rest of the duration of the current flight. Alternatively, the second neural network may be different from the neural network 130.

Figure 3:
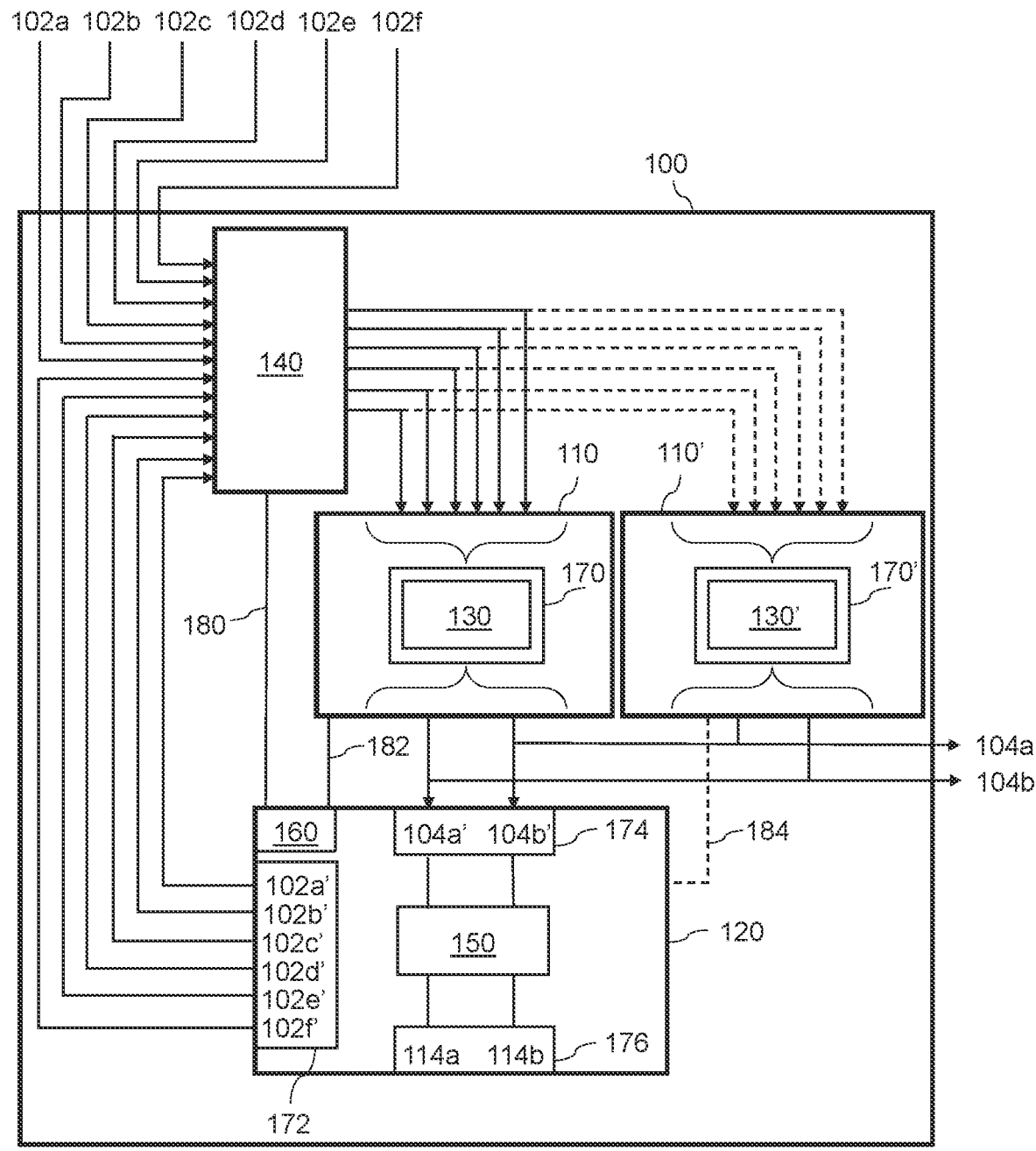
FIG. 3 is a schematic diagram of an aircraft control system according to an example.

FIG. 3 shows an example of an aircraft control system 100 according to an example. The aircraft control system 100 comprises all the features discussed above in relation to FIGS. 1 and 2, and also comprises a backup aircraft control module 110'. The backup aircraft control module 110', according to this example, comprises a memory 170' storing a neural network 130'. The memory 170' may be the same as the memory 170 of the aircraft control module 110, and the neural network 130' may be the same as the neural network 130 of the aircraft control module 110. In other examples, the aircraft control module 110' may not include a neural network. In any case, the backup aircraft control module 110' is adapted to replace the aircraft control module when the authority of the first aircraft control module 110 is selectively removed.

As explained above, the comparison module 150 is adapted to determine whether the test aircraft control outputs, 104'-104b', do not conform to the respective excepted aircraft control outputs, 114a-114b, and the test module 120 is adapted to selectively remove the authority of the control module 110 if the test aircraft control outputs, 104'-104b', do not conform to the respective excepted aircraft control outputs, 114a-114b.

The test module 120 is adapted to authorise the operation of the backup aircraft control module 110' via a control line 184. When the test module 120 authorises the operation of the backup aircraft control module 110', the selector 140 is adapted to select the live aircraft operating inputs, 102a-102f, to be sent to the aircraft control module 110'. The backup aircraft control module 110' is adapted to receive the live aircraft operating inputs, 102a-102f, and generate the live aircraft control outputs, 104a-104b.

For example, consider a scenario in which the aircraft control system 100 is adapted to control the brakes of an aircraft. In case of corruption of the neural network 130, the comparison module 150 of the test module 120 determines that the test aircraft control outputs, 104'-104b', do not conform to the respective excepted aircraft control outputs, 114a-114b. The test module 120 selectively removes the authority of the control module 110 for the remainder of the current flight. The test module 120 authorises the operation of the backup aircraft control module 110' for the remainder of the current flight. The backup aircraft control module 110' receives the live aircraft operating inputs, 102a-102f, related, for example, to an indication of whether there is weight-on-wheels, and indications of environmental conditions such as wind speed and direction, and outside temperature and humidity. The backup aircraft control module 110' generates the live aircraft control outputs, 104a-104b, which are used to control the brakes of the aircraft.

Figure 4:
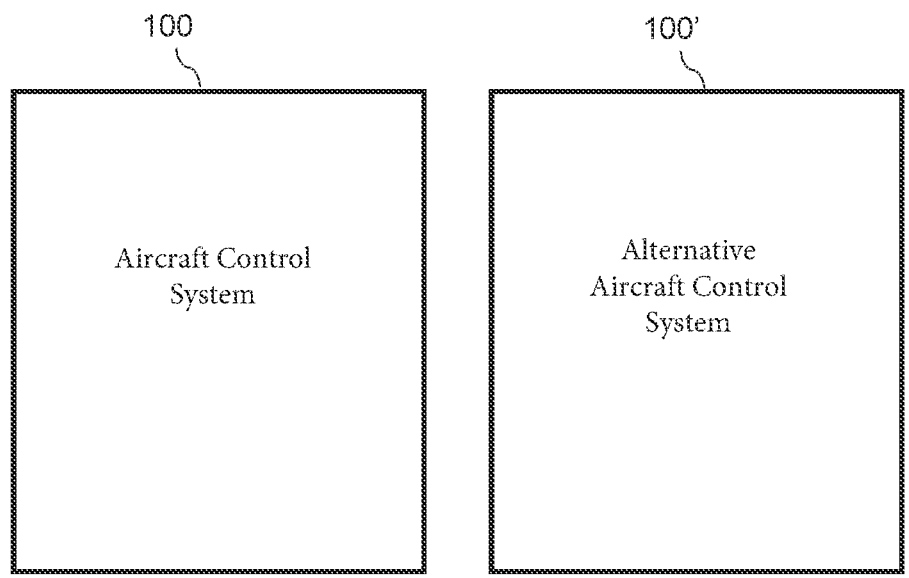
FIG. 4 is a schematic diagram of two aircraft control systems according to an example.

FIG. 4 shows an aircraft control system 100 and an alternative aircraft control system 100'. According to an example, the aircraft control system 100 and the alternative aircraft control system 100' comprise all the features discussed above in relation to FIGS. 1 and 2. The aircraft control system 100 comprises a main or primary aircraft control module 110 whereas the alternative aircraft control system 100' comprises a backup aircraft control module 110'. The backup aircraft control module 110' is a manual system operable to perform aircraft control. In other examples, the backup aircraft control module 110' may comprise a second neural network.

For example, consider a scenario in which the aircraft control system 100' is adapted to control the brakes of an aircraft. In case of corruption of the neural network 130, the comparison module 150 of the test module 120 determines that the test aircraft control outputs, 104'-104b', do not conform to the respective excepted aircraft control outputs, 114a-114b. The test module 120 selectively removes the authority of the control module 110 for the rest of the duration of the current flight and a handover operation is performed to replace the aircraft control system 100 with the alternative aircraft control system 100'. For example, upon authorisation, the pilots of the aircraft may receive an alert to operate the manual system (e.g. the alternative aircraft control system 100'). The pilots of the aircraft operate the brakes for the rest of the duration of a current flight.

Figure 5:
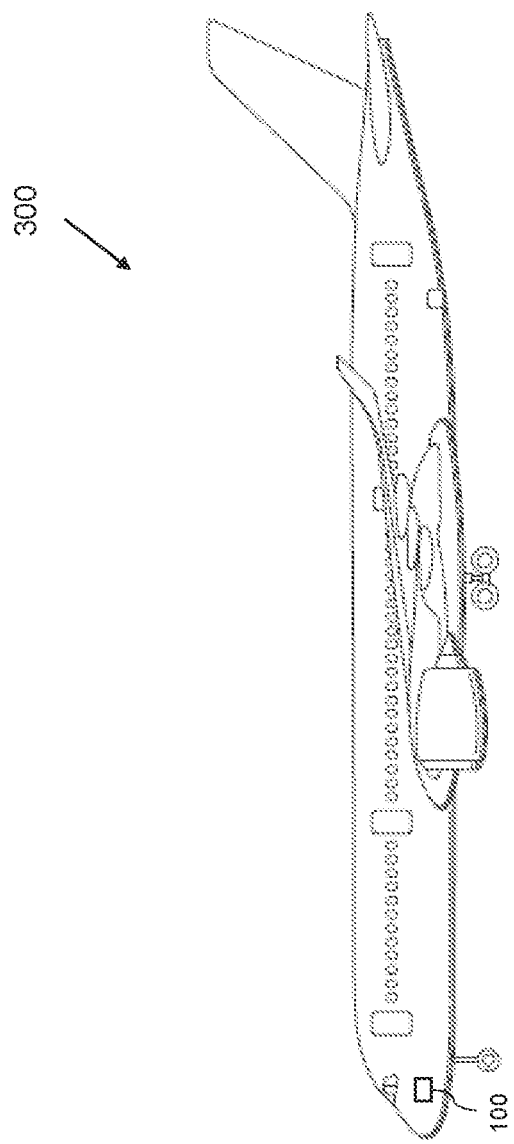
FIG. 5 is a view of an aircraft including an aircraft control system according to an example.

FIG. 5 shows an example of an aircraft 300 an aircraft control system 100 according to the examples described above in relation to FIGS. 1 2 and 3. In the present example, the aircraft 300 is a fully operational aircraft. The aircraft 300 comprises an aircraft control module 110 and a test module 120 according to any of the examples described above and at least one of the following systems: an avionics system, a flight control system, a braking control system, an instrumentation and recording system, a landing gear control system and a fuel system comprising the aircraft control module 110.

Alternatively, the aircraft 300 may be a test aircraft 300 which may not be a fully operational aircraft but may be part of an aircraft. The aircraft control system 100 may be comprised in the test aircraft 300 comprising aircraft systems which the control system 100 is adapted to control. For example, the test aircraft 300 may be missing one or more aircraft systems, such as an avionic system, and may be confined to a test station at which tests are performed on specific aircraft systems which are comprised in the test aircraft 300, such as those controlled by the aircraft control system 100.

Additionally or alternatively, the aircraft 300 may comprise the aircraft control system 100' according to the examples described above in relation to FIG. 5.

The preceding description has been presented to illustrate and describe examples of the principles described. This description is not intended to be exhaustive or to limit these principles to any precise form disclosed. Many modifications and variations are possible in light of the above teaching. For example, as has been alluded to, an aircraft control module of the kind that is described herein may employ a machine learning model other than or in addition to a neural network, for instance a Random Forest or a Support Vector Machine. It is to be understood that any feature described in relation to any one example may be used alone, or in combination with other features described, and may also be used in combination with any features of any other of the examples, or any combination of any other of the examples.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft control system on an operational aircraft, the aircraft control system comprising:
    an aircraft control module on the aircraft and comprising
        a memory storing a machine learning model adapted, based on received live aircraft operating inputs, to generate live aircraft control outputs, to perform aircraft control; and
    a test module on the aircraft and comprising:
        a memory storing input data representing test aircraft operating inputs and storing respective output data representing expected aircraft control outputs that are expected to be generated by the aircraft control module in response to an input of the respective test aircraft operating inputs, and
        a monitor configured to monitor an operating status of the aircraft control module;

wherein, the test module is adapted, while the aircraft control module is not performing aircraft control and while the aircraft is operational, to:

determine, using the monitor, when the aircraft control module is not controlling the aircraft;

when the determination is that the aircraft control module is not controlling the aircraft, retrieve from the memory data indicative of a plurality of the test aircraft operating inputs and respective expected aircraft control outputs corresponding to the plurality of the test aircraft operating inputs, write the plurality of the test aircraft operating inputs to the aircraft control module;

read test aircraft control outputs of the aircraft control module generated based on the plurality of the test aircraft operating inputs; and selectively remove an authority of the aircraft control module to perform aircraft control if the test aircraft control outputs do not conform to the respective expected aircraft control outputs.

2. The aircraft control system according to claim 1, wherein the authority of the aircraft control module is selectively removed by the test module causing a powering off of the aircraft control module.

3. The aircraft control system according to claim 1, wherein the aircraft control module is part of any of: an avionics system, a flight control system, a braking control system, an instrumentation and recording system, a landing gear control system and a fuel system.

4. The aircraft control system according to claim 1, wherein the aircraft control system comprises a backup system configured to replace the aircraft control module when the authority of the aircraft control module is selectively removed.

5. The aircraft control system according to claim 4, wherein the backup system is a manual system operable to perform aircraft control or a backup aircraft control module storing a second machine learning model adapted to generate backup live aircraft control outputs to perform aircraft control.

6. The aircraft control system according to claim 1, wherein the test module writes the test aircraft operating inputs to the aircraft control module while the aircraft control module is not performing aircraft control for a predefined duration.

7. The aircraft control system according to claim 1, wherein the test aircraft operating inputs comprise multiple different sets of test aircraft operating inputs, and wherein, the test module is adapted to write each set of test aircraft operating inputs to the aircraft control module, read test aircraft control outputs of the aircraft control module generated based on each set of the respective test aircraft operating inputs, and selectively remove the authority of the aircraft control module to perform aircraft control if at least one of the test aircraft control outputs do not conform to the respective expected aircraft control outputs for the respective test aircraft operating input set.

8. The aircraft control system according to claim 7, wherein the multiple sets of test aircraft operating inputs are arranged to use each weight, bias and activation function of the machine learning model.

9. A method for controlling an aircraft, the method comprising:

receiving live aircraft operating inputs and generating live aircraft control outputs, based on the received live aircraft operating inputs, using an aircraft control module on the aircraft comprising a memory storing a machine learning model;

controlling the aircraft by the aircraft control module using the live aircraft control outputs generated by the machine learning model;

monitoring an operating status of the aircraft control module to determine when the aircraft control module is not controlling the aircraft;

based on the determination that the aircraft is not controlling the aircraft and while the aircraft module is not controlling the aircraft, retrieving from the memory data indicative of test aircraft operating inputs and respective expected aircraft control outputs corresponding to the test aircraft operating inputs, writing the test aircraft operating inputs to the aircraft control module while the aircraft control module is not performing aircraft control and while the aircraft is operational;

reading test aircraft control outputs of the aircraft control module generated based on the respective test aircraft operating inputs; and selectively removing an authority of the aircraft control module to perform aircraft control if the test aircraft control outputs do not conform to the respective expected aircraft control outputs.

10. The method according to claim 9, wherein the selectively removing the authority of the aircraft control module comprises automatically powering off the aircraft control module.

11. The method according to claim 9, wherein the aircraft control module is part of: an avionics system, a flight control system, a braking control system, an instrumentation and recording system, a landing gear control system and a fuel system.

12. The method according to claim 9, wherein the method comprises replacing the aircraft control module with a backup system when the authority of the aircraft control module is selectively removed.

13. The method according to claim 12, wherein the backup system is a manual system or a backup aircraft control module storing a second machine learning model adapted to generate live aircraft control outputs to perform aircraft control.

14. The method according to claim 9, wherein the writing test aircraft operating inputs to the aircraft control module occurs while the aircraft control module is not performing aircraft control for a predefined duration.

15. The method according to claim 9, wherein the test aircraft operating inputs comprise multiple different sets of test aircraft operating inputs, and wherein, the method comprises writing each set of test aircraft operating inputs to the aircraft control module, reading test aircraft control outputs of the aircraft control module generated based on each set of the respective test aircraft operating inputs, and selectively removing the authority of the aircraft control module to perform aircraft control if at least one of the test aircraft control outputs do not conform to the respective expected aircraft control outputs for the respective test aircraft operating input set.

16. The method according to claim 15, wherein the multiple sets of test aircraft operating inputs are arranged to use each weight, bias and activation function of the machine learning model.

17. A method comprising:
authorizing an aircraft control module on an aircraft to generate live aircraft control outputs to control an aircraft, wherein the authorization gives the aircraft control module an authority;
receiving live aircraft operating inputs at the aircraft control module, wherein the aircraft control module includes a memory storing a machine learning model;
generating the live aircraft control outputs by the aircraft control module using the received live aircraft operating inputs and the machine learning model;
controlling the aircraft with the live aircraft control outputs generated by the machine learning model;
monitoring an operating status of the aircraft control module to determine when the aircraft control module is not controlling the aircraft;
based on the determination that the aircraft is not controlling the aircraft and while the aircraft module is not controlling the aircraft, generating, from previously stored data, test aircraft operating inputs by a test module, wherein a plurality of the test aircraft operating inputs each have a corresponding expected control output;
receiving the test aircraft operating inputs by the aircraft control module while the aircraft control module is not receiving the live operating inputs and not generating the live control outputs, and while the aircraft is operational;
generating test aircraft control outputs by the aircraft control module based on the test aircraft operating inputs and while the aircraft control module is not receiving the live operating inputs and not generating the live control outputs;
comparing the test aircraft control outputs to the corresponding expected control outputs; and
selectively removing the authority of the aircraft control module to control the aircraft if the test aircraft control outputs do not conform to the corresponding expected aircraft control output.

18. The method according to claim 17, wherein the selectively removing the authority of the aircraft control module comprises automatically powering off the aircraft control module.

19. The method according to claim 17, further comprises replacing the aircraft control module with a backup system in response to the authority of the aircraft control module being selectively removed.

20. The method according to claim 19, wherein the backup system is a manual system or a backup aircraft control module storing a second machine learning model adapted to generate backup live aircraft control outputs to perform aircraft control.

21. The aircraft control module of claim 1, wherein the input data representing test aircraft operating inputs includes at least one of information representing: a position of a throttle controlling an engine of the aircraft; a setting for a braking actuator on the aircraft; an operational state of a hydraulic system on the aircraft or an operational state of power system on the aircraft.

22. The aircraft control module of claim 1, wherein the input data representing test aircraft operating inputs includes information representing at least one of: weight-on-wheels of the aircraft, or environmental conditions relevant to the aircraft.

23. The method of claim 9, wherein the data indicative of test aircraft operating inputs includes at least one of information representing: a position of a throttle controlling an engine of the aircraft; a setting for a braking actuator on the aircraft; an operational state of a hydraulic system on the aircraft or an operational state of power system on the aircraft.

24. The method of claim 9, wherein the data indicative of test aircraft operating inputs includes at least one of information representing at least one of: weight-on-wheels of the aircraft, or environmental conditions relevant to the aircraft.

25. The method of claim 17, wherein the data indicative of test aircraft operating inputs includes at least one of information representing: a position of a throttle controlling an engine of the aircraft; a setting for a braking actuator on the aircraft; an operational state of a hydraulic system on the aircraft or an operational state of power system on the aircraft.

26. The method of claim 17, wherein the data indicative of test aircraft operating inputs includes at least one of information representing at least one of: weight-on-wheels of the aircraft, or environmental conditions relevant to the aircraft.

* * * * *